United States Patent
Zhou et al.

(10) Patent No.: US 9,812,861 B2
(45) Date of Patent: Nov. 7, 2017

(54) POWER ADAPTER AND METHOD OF ADAPTING POWER FOR ELECTRONIC DEVICES

(75) Inventors: Peiqi Zhou, Shanghai (CN); Wei Yan, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 446 days.

(21) Appl. No.: 14/350,401

(22) PCT Filed: Oct. 8, 2011

(86) PCT No.: PCT/CN2011/001670
§ 371 (c)(1),
(2), (4) Date: Mar. 25, 2015

(87) PCT Pub. No.: WO2013/049955
PCT Pub. Date: Apr. 11, 2013

(65) Prior Publication Data
US 2015/0236505 A1    Aug. 20, 2015

(51) Int. Cl.
*H02J 1/04*       (2006.01)
(52) U.S. Cl.
CPC ............. *H02J 1/04* (2013.01); *Y10T 307/549* (2015.04)
(58) Field of Classification Search
USPC ........................................................ 307/549
See application file for complete search history.

(56) References Cited

U.S. PATENT DOCUMENTS

| | | | |
|---|---|---|---|
| 6,614,206 B1 | 9/2003 | Wong et al. | |
| 6,741,064 B2 | 5/2004 | Liu et al. | |
| 7,276,813 B2 | 10/2007 | Dobbs et al. | |
| 2005/0141208 A1* | 6/2005 | Niinuma | G06F 1/263 361/797 |

(Continued)

FOREIGN PATENT DOCUMENTS

| | | |
|---|---|---|
| CN | 2615946 Y | 5/2004 |
| CN | 101622612 A | 1/2010 |

(Continued)

OTHER PUBLICATIONS

International Search Report and Written Opinion—PCT/CN2011/001670—ISA/EPO—dated Jul. 19, 2012.

(Continued)

*Primary Examiner* — Rexford Barnie
*Assistant Examiner* — Xuan Ly
(74) *Attorney, Agent, or Firm* — Kilpatrick Townsend & Stockton (57) ABSTRACT

A power adapter and a method of adapting power for electronic devices. Two or more input ports are connectable to electrical power sources. An output port is connectable to an electronic device. A controller is in parallel power-receiving communication with the input ports, in power-providing communication with the output port, and in data-carrying communication between the output port and a first one of the input ports. The method includes checking for electrical power at the first input port and at least one other input port, and when electrical power is present at both, coupling the power from the input ports in parallel to the output port and enabling data communication between the first input port and the output port.

21 Claims, 5 Drawing Sheets

(56) References Cited

U.S. PATENT DOCUMENTS

| | | | |
|---|---|---|---|
| 2005/0184590 A1* | 8/2005 | Dobbs | G06F 1/26 307/43 |
| 2008/0215765 A1* | 9/2008 | Butler | G06F 1/3203 710/15 |
| 2009/0079264 A1 | 3/2009 | Minami | |

FOREIGN PATENT DOCUMENTS

| | | | |
|---|---|---|---|
| GB | 2410846 A | | 8/2005 |
| JP | 2004112891 | * | 4/2004 |
| JP | 2004112891 A | | 4/2004 |
| JP | 2005141732 A | | 6/2005 |
| JP | 2008203981 A | | 9/2008 |
| JP | 2009075902 A | | 4/2009 |

OTHER PUBLICATIONS

Sherman, L., "The Basics of USB Battery Charging: a Survival Guide", Dec. 9, 2010, 15 pages.
Supplementary European Search Report—EP11873547—Search Authority—Munich—dated May 4, 2015.

* cited by examiner

POWER ADAPTER AND METHOD OF ADAPTING POWER FOR ELECTRONIC DEVICES

BACKGROUND

Portable electronic devices such as cell phones, tablet computers, MP3 music players, and the like typically derive electrical power either from internal batteries or from external power sources. The external power source may be a computer or other electronic appliance with which the portable device communicates. Or the external power source may be a dedicated charging power supply.

Many portable devices use USB ports both to communicate with external appliances and to receive electrical power. This power may be used to operate the device, to recharging the batteries, or both. An external appliance meeting the USB 2.0 standard can provide up to 2.5 watts (500 milliamps at 5 volts) through a USB port. Dedicated charging power supplies on the other hand, may provide up to 10 watts (2 amps at 5 volts) or more.

USB battery charging specification revision 1.1, dated 15 Apr. 2009, describes a configuration that provides up to 1.5 amps (7.5 watts) through a single USB port of an appliance. This specification also describes a handshaking protocol whereby a portable device and an appliance communicate to determine how much electrical power the appliance can provide. Very few computers or other appliances have implemented revision 1.1, and hence most appliances are limited to providing 2.5 watts through a USB port.

DRAWINGS

The drawings illustrate by example implementations of the invention.

DETAILED DESCRIPTION

In the drawings and in this description, examples and details are used to illustrate principles of the invention. Other configurations may suggest themselves. Parameters such as voltages and component values are approximate. Some known methods and structures have not been described in detail in order to avoid obscuring the invention. Methods defined by the claims may comprise steps in addition to those listed, and except as indicated in the claims themselves the steps may be performed in another order than that given. Accordingly, the invention may be practiced without limitation to the details and arrangements as described. The invention is to be limited only by the claims, not by the drawings or this description.

Some portable electronic devices, for example notepad computers, require relatively large amounts of electrical power. If such a device is being used in a way that requires it to communicate with a computer or other electronic appliance through a USB connection, the device may need more operating power than the 2.5 watts the appliance can provide through a USB 2.0 port. In this event, the device will draw as much power as it can get from the appliance and it will also draw power from its battery, eventually discharging the battery. A user may of course connect the device to a high-capacity charger for extended operation without discharging the battery. But sometimes the user may need to operate the device in communication with the appliance for an extended period of time. For example, a software engineer who is writing and debugging software for the notepad may need the notepad to communicate with a computer during the writing and debugging process. In such a situation, the user will have to disconnect the device from the appliance from time to time and connect the device to a high-output charger to recharge the battery. Accordingly, there has been a need for a way to operate a portable electronic device in communication with an appliance through a USB 2.0 port for extended periods of time without discharging the battery of the portable device.

Figure 1:
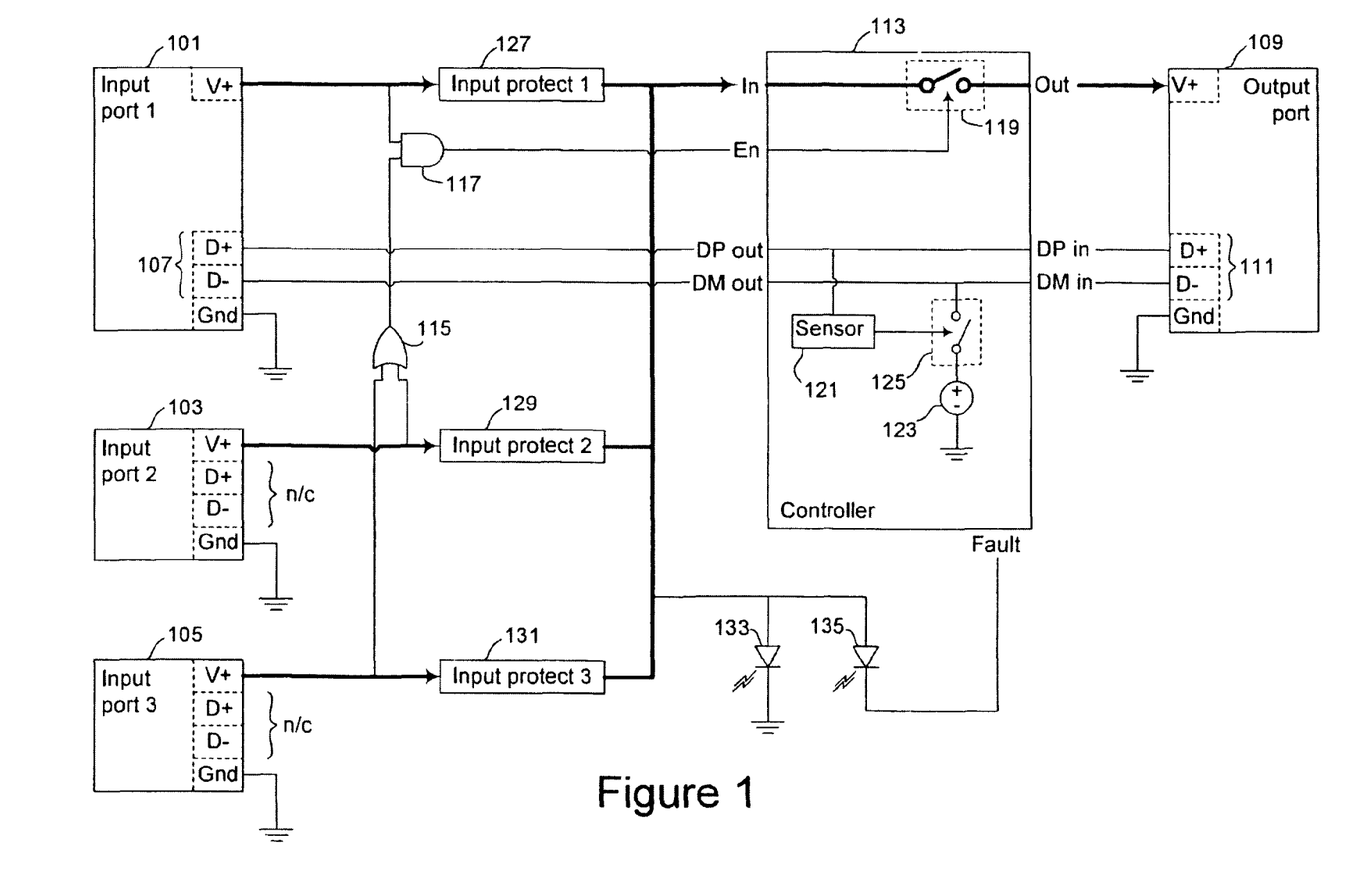
FIG. 1 is a block diagram of a power adapter for electronic devices according to an embodiment of the invention.

Referring to FIG. 1, an electrical power adapter embodying principles of the invention includes a plurality of input ports 101, 103 and 105 each connectable to an electrical power source (not shown). The first port 101 has a data terminal 107 and each of the input ports has a power terminal (V+). An output port 109 is connectable to an electronic device (not shown). The output port has a power terminal (V+) and a data terminal 111. A controller 113 is in parallel power-receiving communication with the power terminals of the input ports, in power-providing communication with the power terminal of the output port, and in data-carrying communication between the data terminal of the output port and the data terminal of the first input port.

In some embodiments a logic element such as a combination of an OR gate 115 and an AND gate 117 is in electrical communication with the power terminals of the input ports. The logic element is responsive to electrical power being present on the power terminal of the first input port and the power terminal of at least one other input port to enable the controller to couple the electrical power to the power terminal of the output port.

More specifically, the power terminal of the second input port 103 and the power terminal of the third input port 105 communicate with inputs of the OR gate 115 such that if either input is at a HI logic level, representing the presence of +5 volt electrical power, the output of the OR gate will be HI. The V+ power terminal of the first input port 101 and the output of the OR gate together drive the AND gate 117. The output of the AND gate will be HI only if both the output of the OR gate and the V+ power terminal of the first input port are HI. Since the OR gate will be HI if either of its inputs is HI, the output of the AND gate will be HI whenever the V+ power terminal of the first input port and the V+ power terminal of at least one other input port are simultaneously providing +5 volts of electrical power.

The output of the AND gate is applied to an Enable input of the controller. The Enable input in turn drives a switch 119 that provides a path for electrical current to flow from an "Input" of the controller to an "Output". The switch is shown as a mechanical contact, but the switch function may be implemented by a switching transistor or some other device. When the switch is closed, electrical current can flow from the V+ power terminals of the input ports to the V+ power terminal of the output port.

The data terminal 107 of the first input port communicates with the data terminal 111 of the output port through the controller. If a portable electronic device is connected to the output port, and if a computer or other appliance is connected to the first input port and a charger is connected to one of the other input ports, the device can draw power simultaneously through both input ports, enough to operate indefinitely without discharging its battery, while communicating with the computer.

In the embodiment shown in FIG. 1 there are three input ports. Other embodiments may have other numbers of input ports so long as there are enough to provide full operating power to a device that draws power through the output port.

In some embodiments the input ports comprise USB ports and the output port comprises a USE port. A USE port has a V+ power line, a ground line (common return) and a data terminal comprising two data lines—a D+ data line and a D− data line. In FIG. 1 the D+ data line from the output port is shown connected to a "DP in" (D Positive) terminal of the controller and the D− data line from the output port is shown connected to a "DM in" (D− Minus) terminal of the controller. Similarly, a "DP out" terminal of the controller is connected to the D+ data line of the first input port and a "DM out" terminal of the controller is connected to the D− data line of the first input port.

A portable device that meets revision 1.1 of the battery charging specification uses a handshaking protocol over the D+ and D− data lines to determine the power-providing capability of whatever appliance is connected to the USB port of the portable device. The portable device asserts a voltage, nominally 0.6 volts DC but actually between about 0.4 and 0.8 volts, on its D+ data line. If the connected device can provide 1.5 amps in accordance with revision 1.1, it asserts a similar voltage on the D− data line. Accordingly, if the D− line goes to a nominal 0.6 volt level, the portable device knows it can draw up to 1.5 amps from the appliance. If the D− line does not go to that level, the portable device knows that it cannot draw more than 500 milliamps from the device. Revision 1.1 describes a further handshaking protocol that may be used to distinguish among different high-capacity power sources, but this protocol need not be discussed here.

In some embodiments, the power adapter uses the handshaking protocol as describe above to inform a portable device connected to the output port that the device can safely draw up to 1.5 amps. Specifically, the controller monitors the D+ data line from the output port through a voltage sensor 121. If the sensor detects a DC voltage between about 0.4 volts and 0.8 volts on the D+ data line, it pulls up the D− data line to a similar voltage level. This may be done for example by connecting a voltage source 123 between the D− data line and ground through a switch 125. The switch 125 may be implemented as a switching transistor or some other device rather than as a mechanical switch contact. The voltage source 123 may be connected between V+ and the D− data line. Other techniques may be used for sensing voltage on the D+ data line, and for pulling up the D− data line, without interfering with data communication between the portable device connected to the output port and an appliance connected to the first input port.

In some embodiments, a power input protector is connected between the power terminals of the input ports and the controller. For example, a power input protector 127 may be connected between the V+ terminal of the first input port and the controller input, a power input protector 129 may be connected between the V+ terminal of the second input port and the controller input, and a power input protector 131 may be connected between the V+ terminal of the third input port and the controller input.

Figure 2:
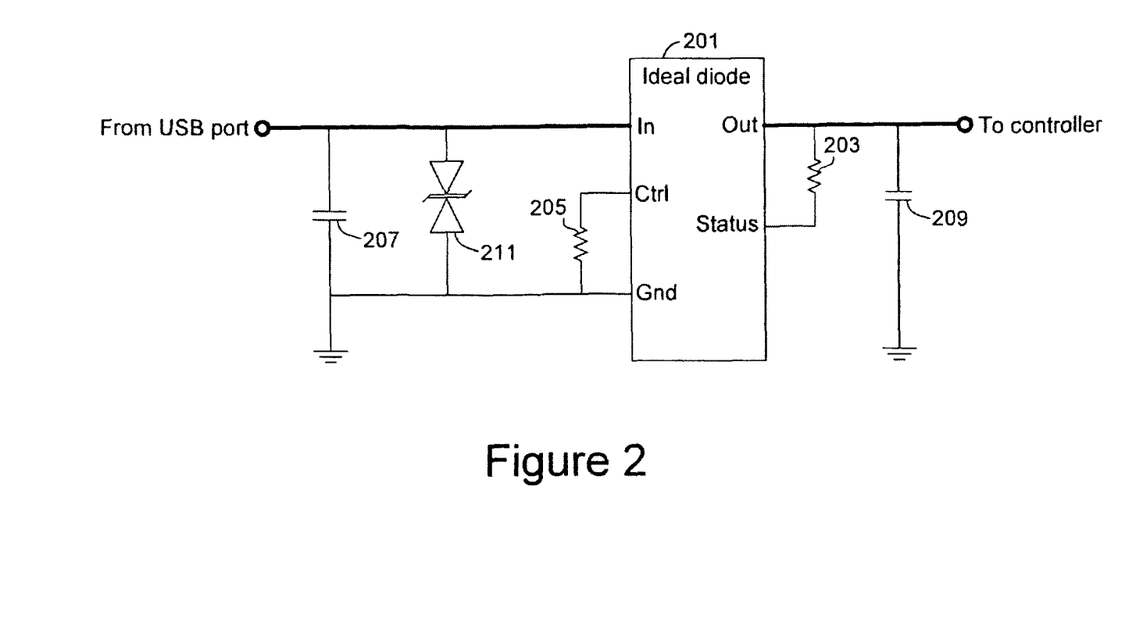
FIG. 2 is a partial schematic of an input protection block of FIG. 1.

A power input protector may comprise an "ideal diode" as shown in FIG. 2. An ideal diode 201 has an input terminal connected to a V+ terminal of one of the input ports and an output terminal connected to the controller input. The ideal diode effectively disconnects its input from its output if it senses a higher voltage on the output than on the input. An example of an ideal diode is a type LTC4411 manufactured by Linear Technology Corporation of Milpitas, Calif. In some embodiments, a resistor 203 (for example, a 470,000 ohm resistor) is connected between a status terminal of the ideal diode and the output terminal. In other embodiments this resistor is omitted, and the status terminal has no connection. In some embodiments a resistor 205 is connected between a control terminal of the ideal diode and ground; the resistor may be implemented as a short circuit from the control terminal to ground or a high-value resistance depending on the desired operation of the ideal diode. A bypass capacitor 207 may be connected between the input of the ideal diode and ground, and a bypass capacitor 209 may be connected between the output of the ideal diode and ground. In some embodiments the capacitor 207 comprises a parallel combination of a 10 microfarad capacitor and a 0.1 microfarad capacitor, and the capacitor 209 comprises a 4.7 microfarad capacitor.

The power input protector may comprise an electrostatic (ESD) protector 211 such as a U-clamp type 1211P manufactured by Semtech Corporation of Camarillo, Calif., connected between the V+ terminal of a USB port and ground.

Returning to FIG. 1, the data terminals (D+ and D− data lines) of the second and third input ports 103 and 105 are not used. This is because these ports are used only to provide additional electrical power to a portable device connected to the output port, not for data communication.

In some applications, a charger connected to either one of the second and third input ports may provide enough power, together with a computer or other appliance connected to the first input port, that the remaining input port need not be used. In such an application, the appliance connected to the first input port provides up to 500 milliamps, a charger connected to one of the other input ports provides 1 amp or more, and two such devices connected in parallel through the power adapter would provide up to 1.5 amps.

In other applications, the second and third input ports may be connected to additional USB ports of the same appliance that is connected to the first input port. Each USB port of the appliance may provide up to 500 milliamps, and three such ports connected in parallel through the power adapter would provide up to 1.5 amps.

A light-emitting diode (LED) 133 may be connected between the controller input and ground to give a visual indication when power is applied to any of the input ports. An LED 135 may be connected between the controller input and a "fault" terminal of the controller to give a visual indication of a fault as signaled by the controller taking the fault terminal to a logic LO level.

Figure 3:
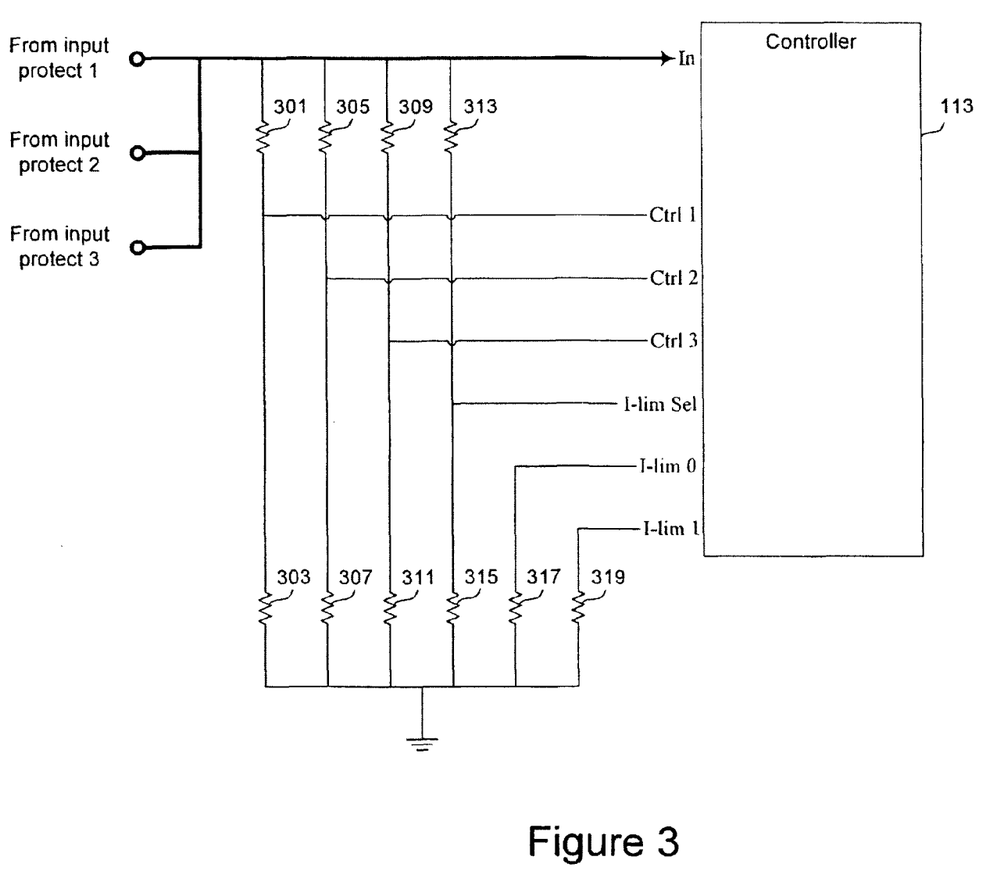
FIG. 3 is a partial schematic connections to the controller of FIG. 1.

Further details of implementing some embodiments are shown in FIG. 3. A first control (Ctrl 1) terminal of the controller 113 is biased by a resistor 301 connected from the Ctrl 1 terminal to V+ on the controller input and a resistor 303 connected from the Ctrl 1 terminal to ground. Similarly, a second control terminal (Ctrl 2) of the controller is biased by a resistor 305 connected from the Ctrl 2 terminal to V+ on the controller input and a resistor 307 connected from the Ctrl 2 terminal to ground. A third control terminal (Ctrl 3) of the controller is biased by a resistor 309 connected from the Ctrl 3 terminal to V+ on the controller input and a resistor 311 connected from the Ctrl 3 terminal to ground. The resistor 301 may be a 100,000 ohm resistor and the resistor 303 may be a 1,000 ohm resistor if a logic LO level is desired on the Ctrl 1 terminal, or the resistor 303 may be an open circuit if a logic HI level is desired on the Ctrl 1 terminal. Similar values may be used for the resistors 305, 307, 309 and 311. A current-limit selector terminal (I-lim Sel) of the controller 113 is biased by a resistor 313 connected from the I-lim Sel terminal to V+ on the controller input, and a resistor 315 connected from the I-lim Sel terminal to ground. The resistor 313 may be a 100,000 ohm resistor and the resistor 315 may be a 1,000 ohm resistor. If a logic LO is desired on the I-lim Sel terminal, the resistor 313 may be open-circuited, and if a logic HI is desired, the resistor 315 may be open-circuited.

A current-limit 0 (I-lim 0) input of the controller is connected to ground through a resistor 317, for example a 28,700 ohm resistor. A current-limit 1 (I-lim 1) input of the controller is connected to ground through a resistor 319, for example a 47,000 ohm resistor. The logic level applied to the I-lim Set terminal determines which of these resistor values is used and thereby determines a limit to the current that can flow between the In and Out terminals of the controller.

In some embodiments the controller comprises a type TPS2540 USB Charging Port Power Switch and Controller manufactured by Texas Instruments.

Figure 4:
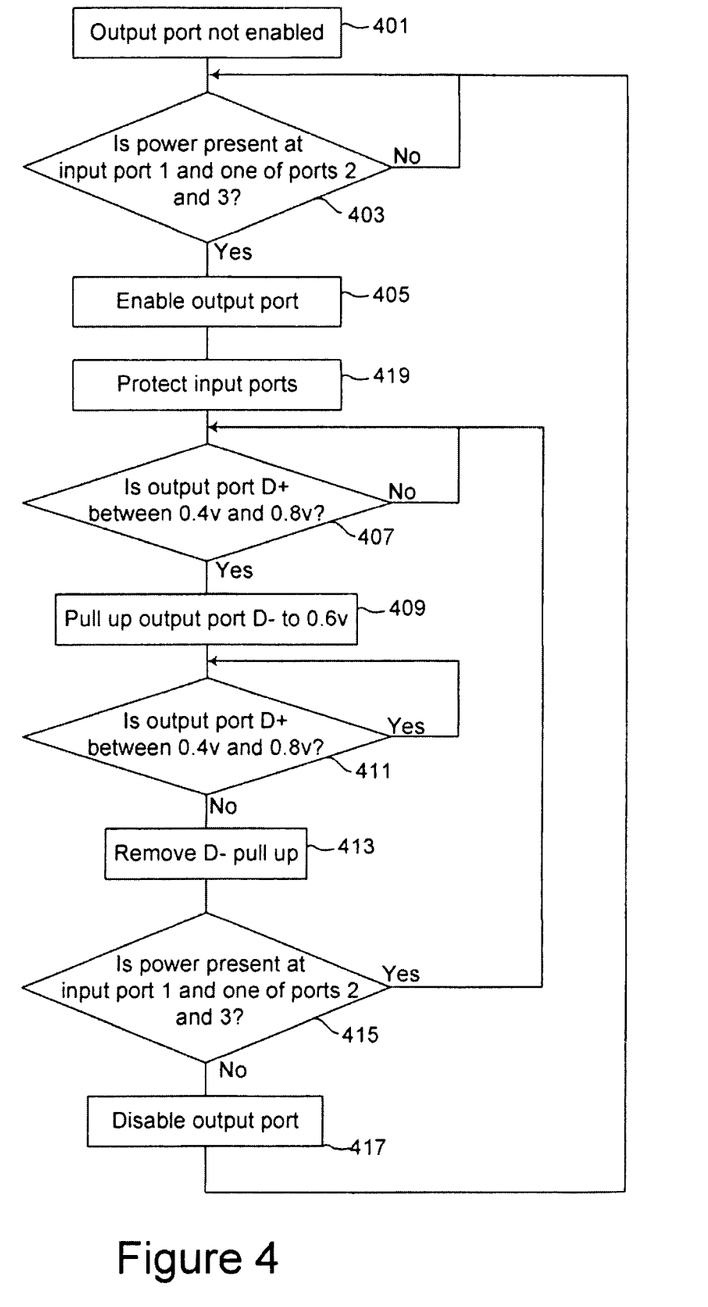
FIG. 4 is a flow chart of a method of adapting power for electronic devices according to an embodiment of the invention.

FIG. 4 shows an embodiment of a method of adapting power for electronic devices. Initially, an output port is not enabled (401); that is, power is not being provided to the output port. The method includes checking (403) for electrical power on a power line of a first input port and on a power line of at least one other input port. When electrical power is present at the first input port and at least one other input port, the output port is enabled (405); that is, electrical power is coupled from the input ports in parallel to the output port and data communication between the first input port and the output port is enabled.

Some embodiments include checking for electrical power on a power line of a third input port. When electrical power is present at the first input port and the third input port, electrical power is coupled from the first and third input ports in parallel to the output port and data communication between the first input port and the output port is enabled. When electrical power is present at the first input port, the other input port, and the third input port, electrical power is coupled in parallel from all three input ports to the output port and data communication between the first input port and the output port is enabled.

In some embodiments the input and output ports comprise USB ports. These embodiments may include checking (407) for presence of a DC voltage between about 0.4 volts and 0.8 volts on a D+ data line of the output port. If the DC voltage is present a D– data line of the output port is pulled up (409) to a DC voltage between about 0.4 volts and 0.8 volts. If the voltage on the D+ data line ceases (411) to be within that range, the pull-up is removed (413). Then if input power is present (415) at the first input port and at least one other input port, the method returns to checking (407) presence of a DC voltage on the D+ data line. If input power is not present (415), the output port is disabled (417) until input power is again present (403).

Figure 5:
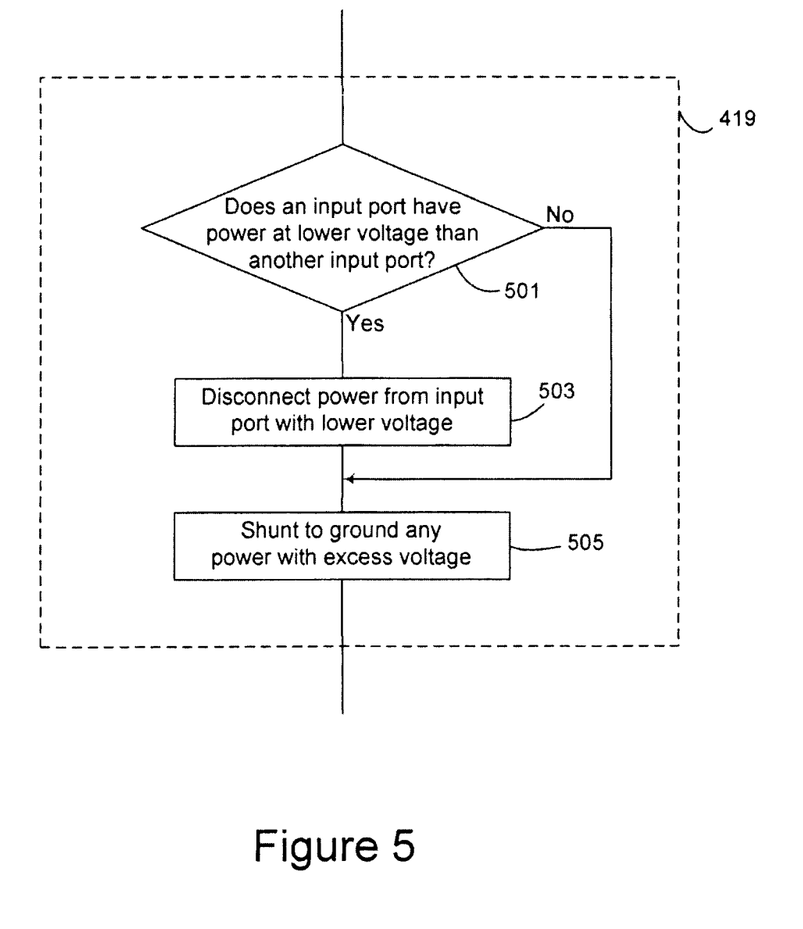
FIG. 5 is a flow chart showing details of block 419 of FIG. 4.

Some embodiments include protecting (419) against electrical power irregularities. As shown in FIG. 5, protecting may include checking (501) whether the electrical power at any input port has a significantly lower voltage than the electrical power at any other input port; and if so, disconnecting (503) the electrical power having the lower voltage. Protecting may include shunting (505) to ground any electrical power having a voltage higher than a predetermined maximum voltage.

A power adapter and a method of adapting power according to embodiments of the invention enable a portable electronic device such as a notebook computer that uses more electrical power than can be provided by a host computer or other appliance through a port such as a standard USB 2.0 port to obtain its needed power simultaneously from two or more sources while maintaining data communication with the host. This makes it possible for a user to operate such a portable device in continuous communication with the host for extended periods of time without discharging the battery in the portable device.

The foregoing description and drawings illustrate by example the principles of the invention but are not intended to be limiting of the invention. The invention is limited only by the claims.

The invention claimed is:

1. An electrical power adapter comprising:
   a plurality of input ports each connectable to an electrical power source, each of the input ports having a power terminal;
   an output port connectable to an electronic device and having a power terminal; and
   a control circuit to control a flow of electrical power to the power terminal of the output port, the control circuit coupled to the power terminals of the input ports and comprising:
      a logical OR circuit having at least two OR inputs and an OR output, a first OR input coupled to the power terminal of a second one of the input ports, a second OR input coupled to the power terminal of a third one of the input ports,
      a logical AND circuit having at least two AND inputs and an AND output, a first AND input coupled to the OR output, a second AND input coupled to the power terminal of the first one of the input ports.

2. The electrical power adapter of claim 1 wherein the control circuit further comprises an electrical switch comprising:
   a switch input coupled to the power terminals of the input ports;
   a switch output coupled to the power terminal of the output port; and
   a switching input coupled to the AND output.

3. The electrical power adapter of claim 1 wherein the plurality of input ports comprises more than three input ports.

4. The electrical power adapter of claim 1 wherein the input ports comprise USB ports and the output port comprises a USB port.

5. The electrical power adapter of claim 4 wherein the controller is responsive to presence of a DC voltage between about 0.4 volts and 0.8 volts on a D+ data line of the output port to pull up a D– data line of the output port to a DC voltage between about 0.4 volts and 0.8 volts.

6. The electrical power adapter of claim 1 and further comprising a power input protector between the controller and the power terminals of the input ports.

7. The electrical power adapter of claim 6 wherein the power input protector comprises a plurality of ideal diodes, each ideal diode in series with the power terminal of one of the input ports.

8. The electrical power adapter of claim 6 wherein the power input protector comprises a plurality of overvoltage protectors each connected between ground and the power terminal of one of the input ports.

9. A method of adapting power for electronic devices comprising:

receiving first, second, and third power inputs from first, second, and third input ports, respectively;

determining, using an OR gate, an OR output using the second and third power inputs as inputs to the OR gate;

determining, using an AND gate, an AND output using the OR output and the first power input as inputs to the AND gate;

providing electrical power to a power terminal of an output port connectable to an electronic device if the AND output indicates both the OR output and the first power input indicate electrical power applied to the first power input and at least one of the second and third power inputs.

10. The method of claim 9 and further comprising:
enabling data communication between the first input port and the output port.

11. The method of claim 9 wherein the input ports comprise USB ports and the output port comprises a USB port.

12. The method of claim 11 and further comprising:
checking for presence of a DC voltage between about 0.4 volts and 0.8 volts on a D+ data line of the output port; and if the DC voltage is present, pulling up a D− data line of the output port to a DC voltage between about 0.4 volts and 0.8 volts.

13. The method of claim 9 and further comprising protecting against electrical power irregularities.

14. The method of claim 13 wherein protecting against electrical power irregularities comprises:
checking whether the electrical power at any of the first, second, or third input ports has a significantly lower voltage than the electrical power at any other input port; and if so, disconnecting the electrical power having the lower voltage.

15. The method of claim 13 wherein protecting against electrical power irregularities comprises shunting to ground any electrical power having a voltage higher than a predetermined maximum voltage.

16. The electrical power adapter of claim 1, wherein a first one of the input ports comprises an input port data terminal, the output terminal comprises an output port data terminal, and wherein the input port data terminal is coupled to the output port data terminal.

17. An electrical power adapter comprising:
first, second, and third means for receiving power signals from a power source;

means for providing a power signal to an electrical device;

an OR logic element means for detecting power received by the second, and third means for receiving power and outputting an OR power enable signal when power is detected from at least one of the second or third means for receiving power;

an AND logic element means for detecting power received by the first means for receiving power and the OR power enable signal, and outputting an AND power enable signal to the means for providing the power signal to the electrical device when power is detected from both the first means for receiving power and the OR power signal; and switching means for selectively providing an electrical connection between the first, second, and third means for receiving power and the means for providing power based on the AND power enable signal.

18. The electrical power adapter of claim 17, further comprising:
means for receiving data signals from a data source; and
means for providing data signals to the electrical device, the means for providing data signals coupled to the means for receiving data signals.

19. The electrical power adapter of claim 17, wherein the OR logic element means is further for outputting an OR power enable signal when power is detected from each of the second and third means for receiving power.

20. The electrical power adapter of claim 17 and further comprising means for providing power protection coupled between the first, second, and third means for receiving power and the means for providing power.

21. The electrical power adapter of claim 20, wherein the means for providing power protection comprises means for providing overvoltage protection.

* * * * *